US012700979B2

(12) United States Patent
Hong et al.

(10) Patent No.: US 12,700,979 B2
(45) Date of Patent: Aug. 4, 2026

(54) METHOD AND DEVICE FOR INDICATING SCS OF INITIAL DOWNLINK BWP

(71) Applicant: VIVO MOBILE COMMUNICATION CO., LTD., Dongguan (CN)

(72) Inventors: Qi Hong, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 420 days.

(21) Appl. No.: 18/236,936

(22) Filed: Aug. 22, 2023

(65) Prior Publication Data

US 2023/0396398 A1 Dec. 7, 2023

Related U.S. Application Data

(63) Continuation of application No. PCT/CN2022/077266, filed on Feb. 22, 2022.

(30) Foreign Application Priority Data

Feb. 23, 2021 (CN) .......................... 202110201097.2

(51) Int. Cl.
*H04L 5/00* (2006.01)

(52) U.S. Cl.
CPC .......... *H04L 5/0092* (2013.01); *H04L 5/0051* (2013.01); *H04L 5/0053* (2013.01)

(58) Field of Classification Search
CPC ... H04L 5/0092; H04L 5/0051; H04L 5/0053; H04W 72/0453; H04W 72/23
See application file for complete search history.

(56) References Cited

U.S. PATENT DOCUMENTS

| | | | |
|---|---|---|---|
| 2019/0305916 A1 | 10/2019 | Liao | |
| 2020/0366398 A1 | 11/2020 | Takeda | |
| 2021/0250947 A1* | 8/2021 | Ryu | ...................... H04L 5/0096 |
| 2021/0329669 A1* | 10/2021 | Gao | ...................... H04W 72/23 |
| 2022/0232567 A1* | 7/2022 | Alriksson | ............. H04L 5/0053 |

FOREIGN PATENT DOCUMENTS

| | | |
|---|---|---|
| CN | 110392989 A | 10/2019 |
| CN | 110831226 A | 2/2020 |
| CN | 111034323 A | 4/2020 |
| CN | 116762309 A | 9/2023 |
| KR | 20200018296 A | 2/2020 |

(Continued)

OTHER PUBLICATIONS

Extended European Search Report issued in related European Application No. 22758862.1, mailed Jul. 18, 2024, 10 pages.

(Continued)

*Primary Examiner* — Chae S Lee
(74) *Attorney, Agent, or Firm* — IPX PLLC

(57) ABSTRACT

A method for indicating SubCarrier Spacing (SCS) of an initial downlink Bandwidth Part (BWP) is provided. The method includes: determining, by a terminal, SCS of an initial downlink BWP based on at least one of the following: a frequency position in which a Synchronization Signal and PBCH Block (SSB) is located, a synchronization raster number of the SSB, a first frequency band in which an operating carrier of the SSB is located, SCS of the SSB, or indication of target signaling.

15 Claims, 5 Drawing Sheets

(56)　　　　　References Cited

FOREIGN PATENT DOCUMENTS

| WO | 2020032728 | A1 | 2/2020 |
| WO | 2021029638 | A1 | 2/2021 |
| WO | 2022154703 | A1 | 7/2022 |

OTHER PUBLICATIONS

First Office Action issued in related Chinese Application No. 202110201097.2, mailed Jan. 1, 2025, 8 pages.

International Search Report issued in corresponding International Application No. PCT/CN2022/077266, mailed May 12, 2022, 4 pages.

Second Office Action issued in related Chinese Application No. 202110201097.2, mailed Jun. 19, 2025, 15 pages.

Moderator (Intel Corporation), "60ghz email_discussion_01_final"3GPP tsg_ran\wg1_rl1, R1-2102238, Feb. 2021, 199 pages.

Moderator (CMCC), "summary of [90E][08][52.6-71GHZ_WI_scoping] Second Intermediate summary", 3GPP tsg_ran\tsg_ran, RP-202926, Dec. 2020, 81 pages.

Office Action issued in related European Application No. 22758862.1, mailed Jun. 13, 2025, 11 pages.

* cited by examiner

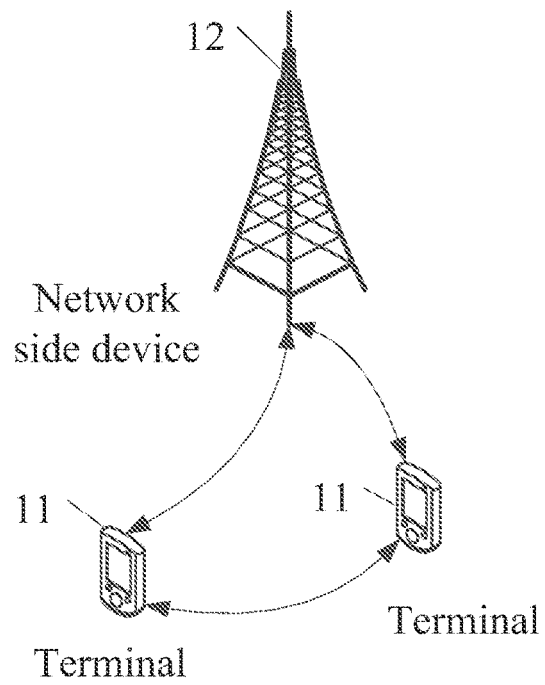

12

Network
side device 11       11

Terminal

Terminal

| Determine, by a terminal, subcarrier spacing SCS of an initial downlink bandwidth part BWP based on at least one of the following:<br>a frequency position in which an SSB is located; a synchronization raster number of the SSB; a first frequency band in which an operating carrier of the SSB is located; SCS of the SSB; and indication of target signaling |
| --- |

Perform, by a network side device and a terminal, transmission of a channel or a signal in an initial downlink BWP; where the terminal is configured to determine SCS of the initial downlink BWP based on at least one of the following: a frequency position in which an SSB is located; a synchronization raster number of the SSB; a first frequency band in which an operating carrier of the SSB is located; SCS of the SSB; and indication of target signaling

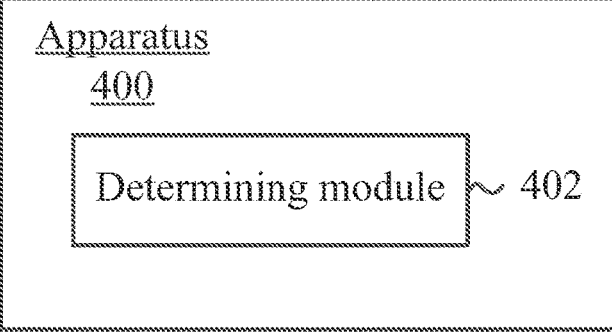

Apparatus
400

Determining module ~ 402

METHOD AND DEVICE FOR INDICATING SCS OF INITIAL DOWNLINK BWP

CROSS-REFERENCE TO RELATED APPLICATIONS

This application is a continuation of International Application No. PCT/CN2022/077266, filed on Feb. 22, 2022, which claims priority to Chinese Patent Application No. 202110201097.2, filed on Feb. 23, 2021. The entire contents of each of the above-referenced applications are expressly incorporated herein by reference.

TECHNICAL FIELD

This application relates to the field of communications technologies, and in particular to a method and device for indicating SubCarrier Spacing (SCS) of an initial downlink Bandwidth Part (BWP).

BACKGROUND

SCS is usually several multiples of 15 kHz (Hz is omitted later), for example, the SCS is 60K, 120K, and the like. Different service types, frequency bands, and moving speeds have different requirements for SCS. In a B52.6 GHz (beyond 52.6 GHz) system, an initial downlink BWP may introduce large SCS, such as the SCS=480K or 960K, which further increases a quantity of the SCS. According to a method for indicating SCS in the related art, a terminal may not be able to determine a plurality of SCS, thereby affecting communication efficiency.

SUMMARY

Embodiments of this application provide a method and device for indicating SCS of an initial downlink BWP.

According to a first aspect, a method for indicating SCS of an initial downlink BWP is provided. The method includes determining, by a terminal, SCS of an initial downlink BWP based on at least one of the following: a frequency position in which an SSB is located; a synchronization raster number of the SSB; a first frequency band in which an operating carrier of the SSB is located; SCS of the SSB; and indication of target signaling.

According to a second aspect, a method for indicating SCS of an initial downlink BWP is provided. The method includes performing, by a network side device and a terminal, transmission of a channel or a signal in an initial downlink BWP. The terminal is configured to determine SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

According to a third aspect, an apparatus for indicating SCS of an initial downlink BWP is provided and includes a determining module configured to determine SCS of an initial downlink BWP based on at least one of the following: a frequency position in which an SSB is located; a synchronization raster number of the SSB; a first frequency band in which an operating carrier of the SSB is located; SCS of the SSB; and indication of target signaling.

According to a fourth aspect, an apparatus for indicating SCS of an initial downlink BWP is provided and includes a transmission module, configured by a terminal to perform transmission of a channel or a signal in the initial downlink

2

BWP. The terminal determines SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

According to a fifth aspect, a terminal is provided. The terminal includes a processor, a memory, and a program or an instruction stored in the memory and capable of running on the processor, where the program or the instruction is executed by the processor to implement the method in the first aspect.

According to a sixth aspect, a network side device is provided. The network side device includes a processor, a memory, and a program or an instruction stored in the memory and capable of running on the processor, where the program or the instruction is executed by the processor to implement the method in the second aspect.

According to a seventh aspect, a readable storage medium is provided. The readable storage medium stores a program or an instruction, and the program or the instruction is executed by a processor to implement the method in the first aspect or the method in the second aspect.

According to an eighth aspect, a computer program product is provided. The computer program product includes a processor, a memory, and a program or an instruction stored in the memory and capable of running on the processor, where when the program or the instruction is executed by the processor, the method in the first aspect is implemented, or the method in the second aspect is implemented.

According to a ninth aspect, a chip is provided. The chip includes a processor and a communications interface, the communications interface is coupled to the processor, and the processor is configured to run a program or an instruction to implement the method in the first aspect or the method in the second aspect.

In the embodiments of this application, a terminal determines SCS of an initial downlink BWP based on at least one of the following: a frequency position in which an SSB is located; a synchronization raster number of the SSB; a first frequency band in which an operating carrier of the SSB is located; SCS of the SSB; and indication of target signaling.

BRIEF DESCRIPTION OF DRAWINGS

FIG. 1 is a schematic diagram of a wireless communications system according to an embodiment of this application;

FIG. 2 is a schematic flowchart of a method for indicating SCS of an initial downlink BWP according to an embodiment of this application;

FIG. 3 is another schematic flowchart of a method for indicating SCS of an initial downlink BWP according to an embodiment of this application;

FIG. 4 is a schematic structural diagram of an apparatus for indicating SCS of an initial downlink BWP according to an embodiment of this application;

DETAILED DESCRIPTION

Figure 5:
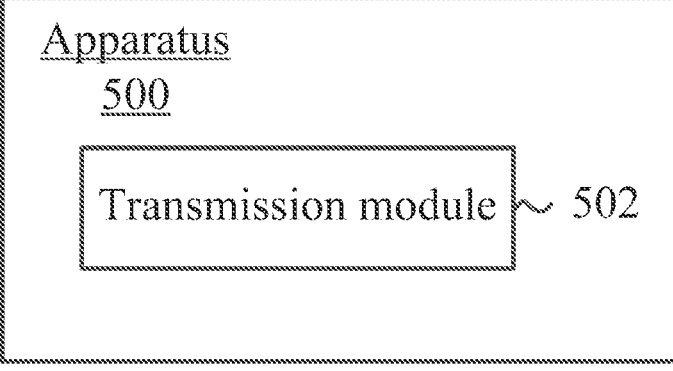
FIG. 5 is another schematic structural diagram of an apparatus for indicating SCS of an initial downlink BWP according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects, and do not need to be used to describe a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. A New Radio (NR) system is described below as an example, and the term NR is used in most of the descriptions, although these technologies can also be used in an application other than an application of the NR system, for example, a 6th Generation (6G) communications system.

FIG. 1 is a schematic diagram of a wireless communications system to which an embodiment of this application can be applied. The wireless communications system includes a terminal 11 and a network side device 12. The terminal 11 may also be referred to as a terminal device or a User Equipment (UE). The terminal 11 may be a terminal device such as a mobile phone, a tablet computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), and Pedestrian User Equipment (PUE). The wearable device includes a bracelet, a headset, and glasses. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a Node B, an evolved node B (eNB), a next generation node B (gNB), a home NodeB, a home evolved NodeB, a Wireless Local Area Network (WLAN) access point, a Wi-Fi node, a Transmission and Reception Point (TRP), or some other appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail the method and device for indicating SCS of an initial downlink BWP provided in the embodiments of this application embodiment through embodiments and application scenarios thereof with reference to the accompanying drawings.

As shown in FIG. 2, the embodiments of this application provide a method 200 for indicating SCS of an initial downlink BWP. The method may be performed by a terminal. In other words, the method may be performed by software or hardware installed in the terminal. The method includes the following steps.

S202: A terminal determines SCS of an initial downlink BWP based on at least one of the following: a frequency position in which a Synchronization Signal and PBCH Block (SSB) is located; a synchronization raster number of the SSB; a first frequency band in which an operating carrier of the SSB is located; SCS of the SSB; and indication of target signaling.

In this embodiment, for example, there is an association relationship between the frequency position in which the SSB is located and the SCS of the initial downlink BWP. If the frequency position in which the SSB is located is a frequency 1, the SCS of the initial downlink BWP is 240 KHz (Hz is omitted later). If the frequency position in which the SSB is located is a frequency 2, the SCS of the initial downlink BWP is 480K. Similar association relationships may be inferred based on above examples. In this way, after determining the frequency position in which the SSB is located, the terminal can obtain the SCS of the initial downlink BWP based on the above association relationships.

Similarly, in this embodiment, there may be an association relationship between the synchronization raster number of the SSB and the SCS of the initial downlink BWP. After determining the synchronization raster number of the SSB, the terminal can obtain the SCS of the initial downlink BWP based on the above association relationship. In this embodiment, there may be an association relationship between the first frequency band in which the operating carrier of the SSB is located and the SCS of the initial downlink BWP. After determining the first frequency band in which the operating carrier of the SSB is located, the terminal can obtain the SCS of the initial downlink BWP based on the above association relationship.

In some embodiments, the first frequency band includes one of the following: (1) a specified frequency range, such as an FR3 or an FR2x, where the FR3 has a frequency higher than 52.6 GHz; and (2) a specified frequency band in the specified frequency range, such as a specified frequency band in an FR2, the FR2x, or the FR3.

In this embodiment, for another example, there is an association relationship between the SCS of the SSB and the SCS of the initial downlink BWP. After determining the SCS of the SSB, the terminal can obtain the SCS of the initial downlink BWP based on the above association relationship. For example, the SCS of the SSB is equal to the SCS of the initial downlink BWP, and the terminal directly uses the SCS of the SSB as the SCS of the initial downlink BWP. For another example, there is an association relationship in which the SCS of the initial downlink BWP is a multiple of the SCS of the SSB, and the terminal derives the SCS of the initial downlink BWP based on this relationship after obtaining the SCS of the SSB.

In this embodiment, for another example, before S202, the terminal can receive target signaling from a network side device, and the target signaling is used to indicate the SCS of the initial downlink BWP. The target signaling may be system signaling or Radio Resource Control (RRC) signaling.

In the above several examples, the terminal determines the SCS of the initial downlink BWP based on one of the five types of information in S202. In fact, the terminal can also determine the SCS of the initial downlink BWP based on at least two of the above five types of information. For example, the terminal determines the SCS of the initial downlink BWP based on the SCS of the SSB and the indication of the target signaling. For example, in a case that the SCS of the SSB is 120K, the SCS of the SSB is used as the SCS of the initial downlink BWP, that is, the SCS of the initial downlink BWP is also 120K. In a case that the SCS of the SSB is 480K or 960K, the SCS of the initial downlink BWP is determined based on the indication of the target signaling.

In some embodiments, after S202, a following step may be included: performing transmission of a channel or a signal in the initial downlink BWP based on the SCS of the initial downlink BWP. The channel or signal may be related to an initial access process, such as a random access preamble, a Physical Downlink Control Channel (PDCCH), or a Physical Downlink Shared Channel (PDSCH).

In the method for indicating SCS of an initial downlink BWP provided in the embodiments of this application, the terminal determines the SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

In some embodiments, the determining SCS of an initial downlink BWP in the method 200 includes one of the following three.

(1) The SCS of the SSB is used as the SCS of the initial downlink BWP. In this example, the SCS of the SSB is equal to the SCS of the initial downlink BWP.

(2) The SCS of the initial downlink BWP is determined based on the SCS of the SSB and the indication of the target signaling. In this example, the SCS of the initial downlink BWP may be determined based on the SCS of the SSB and an indication field in the target signaling, and the indication field is used to indicate the SCS of the initial downlink BWP.

(3) The SCS of the initial downlink BWP is determined based on the indication of the target signaling. The target signaling may be system signaling or RRC signaling. In this example, the SCS of the initial downlink BWP may be determined based on the indication field in the target signaling, and the indication field is used to indicate the SCS of the initial downlink BWP.

In the foregoing (2), that the SCS of the initial downlink BWP is determined based on the SCS of the SSB and the indication of the target signaling includes at least one of the following two.

(a) The SCS of the SSB is used as the SCS of the initial downlink BWP in a case that the SCS of the SSB is first target SCS.

(b) The SCS of the initial downlink BWP is determined based on the indication of the target signaling in a case that the SCS of the SSB is second target SCS.

In this embodiment, the first target SCS is not equal to the second target SCS. For example, the first target SCS may be 120K, and the second target SCS may be 480K or 960K. For example, the first target SCS may be 480K or 960K, and the second target SCS may be 120K.

In an example, there are a plurality of possible values for the SCS of the SSB, such as 120K, 480K, or 960K. There are also a plurality of possible values for the SCS of the initial downlink BWP, such as 120K, 480K, or 960K. If the SCS of the SSB is 120K, the SCS of the initial downlink BWP is 120K by default, that is, the SCS of the initial downlink BWP is bound to the SCS of the SSB. If the SCS of the SSB is 480K and/or 960K and there is no relationship between the SCS of the initial downlink BWP and the SCS of the SSB, the target signaling is used to indicate whether the SCS of the initial downlink BWP is 480K or 960K. The target signaling may be a common subcarrier spacing (subCarrierSpacingCommon) indication field in system signaling.

That the SCS of the SSB is used as the SCS of the initial downlink BWP in the foregoing (1) includes that the SCS of the SSB is used as the SCS of the initial downlink BWP in a case that the SCS of the SSB is third target SCS.

That the SCS of the initial downlink BWP is determined based on the indication of the target signaling in the foregoing (3) includes that the SCS of the initial downlink BWP is determined based on the indication of the target signaling in a case that the SCS of the SSB is fourth target SCS.

The foregoing two embodiments may be implemented independently. In this way, the third target SCS may be equal or unequal to the fourth target SCS. The foregoing two embodiments may be implemented simultaneously. In this way, the third target SCS may be unequal to the fourth target SCS. For example, the third target SCS may be 120K, and the fourth target SCS may be 480K or 960K. For another example, the third target SCS may be 480K or 960K, and the fourth target SCS may be 120K.

In some embodiments, the target signaling in the (2) or (3) includes an indication field. The indication field is used to indicate target information in a case that the SCS of the SSB is fifth target SCS; and/or the indication field is used to indicate the SCS of the initial downlink BWP in a case that the SCS of the SSB is sixth target SCS.

In this embodiment, the target information may be different from the SCS of the initial downlink BWP. In other words, the indication field is not used to indicate the SCS of the initial downlink BWP in a case that the SCS of the SSB is the fifth target SCS. The fifth target SCS is unequal to sixth target SCS. For example, the fifth target SCS may be 120K, and the sixth target SCS may be 480K or 960K. For another example, the fifth target SCS may be 480K or 960K, and the sixth target SCS may be 120K.

In an example, in a case that the SCS of the SSB is the fifth target SCS, a common subcarrier spacing indication field in the system information does not need to indicate the SCS of the initial downlink BWP. In this case, the SCS of the initial downlink BWP may be equal to the SCS of the SSB, and the common subcarrier spacing indication field is not used to indicate the SCS of the initial downlink BWP. In a case that the SCS of the SSB is the sixth target SCS, the common subcarrier spacing indication field in the system information is used to indicate the SCS of the initial downlink BWP. In this case, the SCS of the initial downlink BWP may be unrelated to the SCS of the SSB. Therefore, in the above two cases, the common subcarrier spacing indication field has different functions.

In some embodiments, the target signaling in the (2) or (3) includes a target indication field. The target indication field is used to indicate the SCS of the initial downlink BWP. The target indication field is the common subcarrier spacing indication field. In some alternative embodiments, the target indication field includes a first indication field and a second indication field. The first indication field is the common subcarrier spacing indication field.

In this embodiment, it is considered that if the common subcarrier spacing indication field in the related art is 1 bit, SCS of a plurality of (that is, more than two) initial downlink BWPs cannot be directly indicated. Therefore, the common subcarrier spacing indication field may be extended, for example, to 2 bit, or an additional second indication field may be used for indication. The second indication field may be used to independently indicate the SCS of the initial downlink BWP. In some alternative embodiments, the second indication field and the common subcarrier spacing indication field may be used to indicate the SCS of the initial downlink BWP by using a method of joint encoding.

In some embodiments, the second indication field in the foregoing embodiment may include at least one of the following:

(1) a Physical Downlink Shared Channel-Demodulation Reference Signal (PDSCH-DMRS) position indication field in the SSB;

(2) a physical downlink control channel Configuration System information Block (for example, pdcch-ConfigS1B1) indication field in the SSB;

(3) an SSB-subcarrier offset indication field in the SSB; and (4) a reserved field in the SSB.

It may be understood that when the second indication field is one of the foregoing (1) to (4), the second indication field may be used to independently indicate the SCS of the initial downlink BWP, or the second indication field and the common subcarrier spacing indication field may indicate the SCS of the initial downlink BWP by using a method of joint encoding.

When the second indication field is at least two of the foregoing (1) to (4), the least two may indicate the SCS of the initial downlink BWP by using a method of joint encoding.

In an example, the second indication field includes the PDSCH-DMRS position indication field. The PDSCH-DMRS position indication field has an association relationship with the SCS of the SSB. In some alternative embodiments, the PDSCH-DMRS position indication field is used to indicate a fixed PDSCH-DMRS position and has no association relationship with the SCS of the SSB.

For example, there is an association between the PDSCH-DMRS position indication field and the SCS of the SSB. For example, when the SCS of the SSB is a first value, a PDSCH-DMRS position is the third symbol in a slot. When the SCS of the SSB is a second value, the PDSCH-DMRS position is the fourth symbol in the slot. Therefore, the PDSCH-DMRS position indication field does not need to indicate the PDSCH-DMRS position, and may be used to indicate the SCS of the initial downlink BWP.

For example, the PDSCH-DMRS position indication field is used to indicate a fixed PDSCH-DMRS position. Therefore, the PDSCH-DMRS position indication field does not need to further indicate the PDSCH-DMRS position, and may be used to indicate the SCS of the initial downlink BWP.

In an example, the second indication field includes a physical downlink control channel configuration system information block indication field. A quantity of valid licenses in a configuration table corresponding to a Control Resource Set (CORESET) indicated by the physical downlink control channel configuration system information block indication field is smaller than a first threshold; and/or a quantity of valid licenses in a configuration table corresponding to a search space indicated by the physical downlink control channel configuration system information block indication field is smaller than a second threshold.

In this example, because some indication bits in the physical downlink control channel configuration system information block indication field are used to indicate the SCS of the initial downlink BWP, the terminal assumes that a quantity of valid licenses in a configuration table corresponding to a CORESET #0 decreases, that is, smaller than the first threshold, and/or that the terminal assumes that a quantity of valid licenses in a configuration table corresponding to a search space #0 decreases, that is, smaller than the second threshold.

In an example, the second indication field includes the SSB-subcarrier offset indication field. The SSB-subcarrier offset indication field includes an indication bit that is used to indicate the SCS of the initial downlink BWP.

In this example, it is considered that for certain SCS of the SSB, there may be a case in which only some bits in the SSB-subcarrier offset indication field are used. In this case, rest of the bits may be used to indicate the SCS of the initial downlink BWP. For example, the SSB-subcarrier offset indication field has 4 bits. In some cases, for example, for some fixed SSB subcarrier offsets, 3 bits are sufficient to indicate a subcarrier spacing offset of the SSB. Therefore, the extra 1 bit may be used to indicate the SCS of the initial downlink BWP.

The following describes in detail the method for indicating SCS of an initial downlink BWP provided in the embodiments of this application with reference to two embodiments.

Embodiment 1

This embodiment may be applied to a B52.6 GHz system. It is assumed in this embodiment that a B52.6 GHz frequency band is categorized into a new frequency band, such as an FR2× frequency band or an FR3 frequency band. In this case, 1 bit in the common subcarrier spacing indication field may be used to indicate the SCS of the initial downlink BWP.

In this embodiment, the SCS of the initial downlink BWP may be determined in the following three methods.

Method 1: The SCS of the initial downlink BWP is consistent with the SCS of the SSB.

Method 2: The SCS of some initial downlink BWPs is consistent with the SCS of the SSB.

Method 3: The SCS of the initial downlink BWP is not related to the SCS of the SSB, and the SCS of the initial downlink BWP may be indicated by using target signaling.

In Method 1, for example, the terminal may determine by default that the SCS of the initial downlink BWP is consistent with the SCS of the SSB received by the terminal. Therefore, in this method, the common subcarrier spacing indication field is not required.

In Method 2, if there are a plurality of possible values for the SCS of the SSB, such as 120K, 480K, and/or 960K, there are also a plurality of possible values for the SCS of the initial downlink BWP, such as 120K, 480K, and/or 960K.

If the SCS of the SSB is 120K, the terminal determines directly by default that the SCS of the initial downlink BWP is 120K. If the SCS of the SSB is 480K and/or 960K, the common subcarrier spacing indication field is used to indicate whether the SCS of the initial downlink BWP is 480K or 960K.

If there are a plurality of possible values for the SCS of the SSB, such as 120K, 240K, 480K, or 960K, there are also a plurality of possible values for the SCS of the initial downlink BWP, such as 120K, 240K, 480K, or 960K. In this case, there are following two possibilities.

Possibility 1: When the SCS of the SSB is 120K, the terminal determines directly by default that the SCS of the initial downlink BWP is 120K. When the SCS of the SSB is 240K, the terminal determines directly by default that the SCS of the initial downlink BWP is 240K. If the SCS of the SSB is 480K or 960K, the common subcarrier spacing indication field is used to indicate whether the SCS of the initial downlink BWP is 480K or 960K.

Possibility 2: When the SCS of the SSB is 120K, the terminal determines directly by default that the SCS of the initial downlink BWP is also 120 k. If the SCS of the SSB is 240K, 480K, or 960K, an indication field in the target signaling is used to indicate whether the SCS of the initial downlink BWP is 240K, 480K, or 960K. In this case, because the common subcarrier spacing only has 1 bit, which is not enough to indicate three types of SCS, more bits are needed. In this embodiment, the common subcarrier spacing indication field may be extended, for example, to 2 bits, or an additional second indication field is used for indication. For example, refer to the previous embodiments.

In Method 3, if the SCS of the initial downlink BWP is not related to the SCS of the SSB, the SCS of the initial downlink BWP may be indicated by using the common subcarrier spacing indication field. If a quantity of candidate combinations of the SCS of the initial downlink BWP is greater than two, because the common subcarrier spacing indication field only has 1 bit, which is not enough to indicate three types of SCS, more bits are needed. In this embodiment, the common subcarrier spacing indication field may be extended, for example, to 2 bits, or an additional second indication field is used for indication. For example, refer to the previous embodiments.

Embodiment 2

This embodiment may be applied to a B52.6 GHz system. It is assumed in this embodiment that the B52.6 GHz frequency band is directly categorized into an FR2 frequency band. In this case, 1 bit in the common subcarrier spacing indication field has been used for (60K, and 120K) indication. Therefore, it is necessary to indicate the SCS of values other than 60K and 120K by using the following methods.

Method 1: The SCS of the initial downlink BWP is consistent with the SCS of the SSB.

Method 2: The SCS of some initial downlink BWPs is consistent with the SCS of the SSB.

Method 3: The SCS of the initial downlink BWP is not related to the SCS of the SSB, and the SCS of the initial downlink BWP may be indicated by using target signaling.

In Method 1, for example, the terminal may determine by default that the SCS of the initial downlink BWP is consistent with the SCS of the SSB received by the terminal. In this case, extra bits are not required for indication.

In Method 2, if there are a plurality of possible values for the SCS of the SSB, such as 120K, 480K, and/or 960K, there are also a plurality of possible values for the SCS of the initial downlink BWP, such as 120K, 480K, and/or 960K. If the SCS of the SSB is 120K, the SCS of the initial downlink BWP is 120K by default. If the SCS of the SSB is 480K and/or 960K, extra bits are used to indicate whether the SCS of the initial downlink BWP is 480K or 960K. In this embodiment, the common subcarrier spacing indication field may be extended, for example, to 2 bits, or an additional second indication field is used for indication. For example, refer to the previous embodiments.

In Method 3, the SCS of the initial downlink BWP is not related to the SCS of the SSB. Therefore, the SCS of the initial downlink BWP may be indicated by using extra bits. In this embodiment, the common subcarrier spacing indication field may be extended, for example, to 2 bits, or an additional second indication field is used for indication. For example, refer to the previous embodiments.

The method for indicating SCS of an initial downlink BWP according to an embodiment of this application is described above in detail with reference to FIG. 2. The method for indicating SCS of an initial downlink BWP according to another embodiment of this application is described below in detail with reference to FIG. 3. It may be understood that interaction between a network side device and a terminal described from the perspective of the network side device is the same as that described on the terminal side in the method shown in FIG. 2. To avoid repetition, related descriptions are appropriately omitted.

FIG. 3 is a schematic diagram of an implementation process of a method for indicating SCS of an initial downlink BWP in the embodiments of this application, which may be applied to a network side device. As shown in FIG. 3, a method 300 includes the following steps.

S302: A network side device and a terminal performs transmission of a channel or a signal in an initial downlink BWP; where the terminal is configured to determine SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

In the embodiments of this application, a terminal determines SCS of an initial downlink BWP based on at least one of the following: a frequency position in which an SSB is located; a synchronization raster number of the SSB; a first frequency band in which an operating carrier of the SSB is located; SCS of the SSB; and indication of target signaling. In the embodiments of this application, the network side device and the terminal can perform transmission of a channel or a signal in the initial downlink BWP, thereby improving communication efficiency.

It should be noted that an execution subject of the method for indicating SCS of an initial downlink BWP according to an embodiment of this application may be an apparatus for indicating SCS of an initial downlink BWP, or a control module for performing the method for indicating SCS of an initial downlink BWP in the apparatus for indicating SCS of an initial downlink BWP. In the embodiments of this application, an example in which the apparatus for indicating SCS of an initial downlink BWP performs the method for indicating SCS of an initial downlink BWP is used to describe the apparatus for indicating SCS of an initial downlink BWP provided in the embodiments of this application.

FIG. 4 is a schematic structural diagram of an apparatus for indicating SCS of an initial downlink BWP according to an embodiment of this application. An apparatus 400 may correspond to a terminal in other embodiments.

As shown in FIG. 4, the apparatus 400 includes a determining module 402 configured to determine the SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

In the embodiments of this application, the SCS of the initial downlink BWP may be determined based on at least one of the following: a frequency position in which an SSB is located; a synchronization raster number of the SSB; a first frequency band in which an operating carrier of the SSB is located; SCS of the SSB; and indication of target signaling.

For example, in an embodiment, the determining module 402 is configured to perform one of the following: using the SCS of the SSB as the SCS of the initial downlink BWP; determining the SCS of the initial downlink BWP based on the SCS of the SSB and the indication of the target signaling; and determining the SCS of the initial downlink BWP based on the indication of the target signaling.

For example, in an embodiment, the determining module 402 is configured to perform one of the following: using the SCS of the SSB as the SCS of the initial downlink BWP in a case that the SCS of the SSB is first target SCS; and determining the SCS of the initial downlink BWP based on the indication of the target signaling in a case that the SCS of the SSB is second target SCS.

For example, in an embodiment, the using the SCS of the SSB as the SCS of the initial downlink BWP includes using the SCS of the SSB as the SCS of the initial downlink BWP in a case that the SCS of the SSB is third target SCS; and/or the determining the SCS of the initial downlink BWP based on the indication of the target signaling includes determining the SCS of the initial downlink BWP based on the indication of the target signaling in a case that the SCS of the SSB is fourth target SCS.

For example, in an embodiment, the target signaling includes an indication field. The indication field is used to indicate target information in a case that the SCS of the SSB is fifth target SCS; and/or the indication field is used to indicate the SCS of the initial downlink BWP in a case that the SCS of the SSB is sixth target SCS.

For example, in an embodiment, the target signaling includes a target indication field that is used to indicate the SCS of the initial downlink BWP. The target indication field is a common subcarrier spacing indication field. In some alternative embodiments, the target indication field includes a first indication field and a second indication field, and the first indication field is the common subcarrier spacing indication field.

For example, in an embodiment, the second indication field includes at least one of the following: a PDSCH-DMRS position indication field in the SSB; a physical downlink control channel configuration system information block indication field in the SSB; an SSB-subcarrier offset indication field in the SSB; and a reserved field in the SSB.

For example, in an embodiment, the second indication field includes the PDSCH-DMRS position indication field. The PDSCH-DMRS position indication field has an association relationship with the SCS of the SSB. In some alternative embodiments, the PDSCH-DMRS position indication field is used to indicate a fixed PDSCH-DMRS position and has no association relationship with the SCS of the SSB.

For example, in an embodiment, the second indication field includes the physical downlink control channel configuration system information block indication field. A quantity of valid licenses in a configuration table corresponding to a CORESET indicated by the physical downlink control channel configuration system information block indication field is smaller than a first threshold; and/or a quantity of valid licenses in a configuration table corresponding to a search space indicated by the physical downlink control channel configuration system information block indication field is smaller than a second threshold.

For example, in an embodiment, the second indication field includes the SSB-subcarrier offset indication field. The SSB-subcarrier offset indication field includes an indication bit that is used to indicate the SCS of the initial downlink BWP.

For example, in an embodiment, the first frequency band includes one of the following: a specified frequency range; and a specified frequency band in the specified frequency range. For example, in an embodiment, the apparatus 400 further includes a transmission module (now shown in the figure) configured to perform transmission of a channel or a signal in the initial downlink BWP based on the SCS of the initial downlink BWP.

For the apparatus 400 according to this embodiment of this application, reference may be made to the processes of the method 200 in the corresponding embodiment of this application, and the units/modules of the apparatus 400 and other operations and/or functions described above are respectively intended to implement the corresponding processes in the method 200, with the same or equivalent technical effects achieved. For brevity, details are not repeated herein.

The apparatus for indicating SCS of an initial downlink BWP in the embodiments of this application may be an apparatus, or a component, an integrated circuit, or a chip in a terminal. The apparatus may be a mobile terminal, or a non-mobile terminal. For example, the mobile terminal may include but is not limited to the foregoing listed types of terminals II. The non-mobile terminal may be a server, a Network Attached Storage (NAS), a Personal Computer (PC), a Television (TV), a teller machine, or a self-service machine. This is not specifically limited in this embodiment of this application.

The apparatus for indicating SCS of an initial downlink BWP in the embodiments of this application may be an apparatus with an operating system. The operating system may be an Android operating system, may be an iOS operating system, or may be another possible operating system. This is not specifically limited in this embodiment of this application.

The apparatus for indicating SCS of an initial downlink BWP provided in the embodiments of this application can implement the processes implemented in the method embodiments in FIG. 2 and FIG. 3, with the same technical effect achieved. To avoid repetition, details are not described herein again.

FIG. 5 is a schematic structural diagram of an apparatus for indicating SCS of an initial downlink BWP according to an embodiment of this application. The apparatus may correspond to the network side device in other embodiments.

As shown in FIG. 5, an apparatus 500 includes a transmission module 502 that is configured by a terminal to perform transmission of a channel or a signal in the initial downlink BWP. The terminal determines SCS of the initial downlink BWP based on at least one of the following: a frequency position in which an SSB is located; a synchronization raster number of the SSB; a first frequency band in which an operating carrier of the SSB is located; SCS of the SSB; and indication of target signaling.

In the embodiments of this application the terminal determines SCS of the initial downlink BWP based on at least one of the following: a frequency position in which an SSB is located; a synchronization raster number of the SSB; a first frequency band in which an operating carrier of the SSB is located; SCS of the SSB; and indication of target signaling. In the embodiments of this application, the apparatus 500 and the terminal can perform transmission of a channel or a signal in the initial downlink BWP, thereby improving communication efficiency.

For the apparatus 500 according to this embodiment of this application, reference may be made to the processes of the method 300 in the corresponding embodiment of this application, and the units/modules of the apparatus 500 and other operations and/or functions described above are respectively intended to implement the corresponding processes in the method 300, with the same or equivalent technical effects achieved. For brevity, details are not repeated herein.

Figure 6:
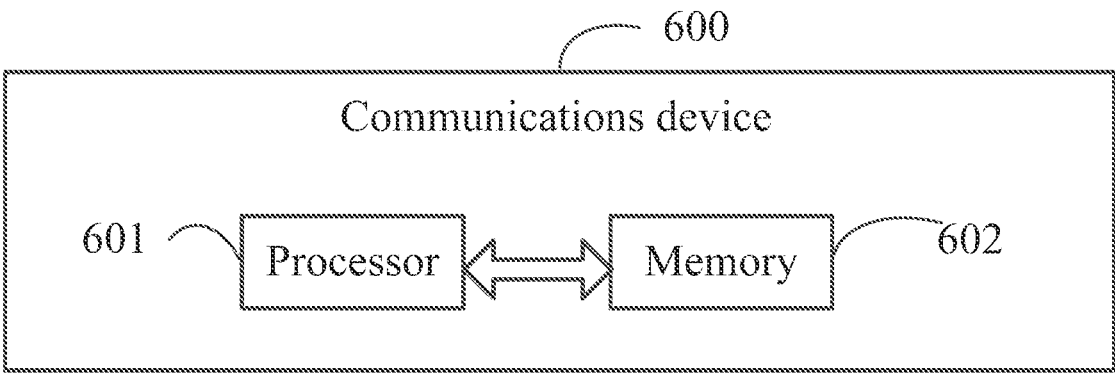
FIG. 6 is a schematic structural diagram of a communications device according to an embodiment of this application.

For example, as shown in FIG. 6, an embodiment of this application further provides a communications device 600, including a processor 601, a memory 602, and a program or an instruction stored in the memory 602 and capable of running on the processor 601. For example, when the communications device 600 is a terminal, and the program or the instruction is executed by the processor 601, the processes of the foregoing method embodiments for indicating SCS of an initial downlink BWP are implemented, with the same technical effects achieved. To avoid repetition, details are not described herein again. When the communications device 600 is a network side device, and the program or the instruction is executed by the processor 601, the processes in the foregoing method embodiments for indicating SCS of an initial downlink BWP are implemented, with the same technical effect achieved. To avoid repetition, details are not described herein again.

Figure 7:
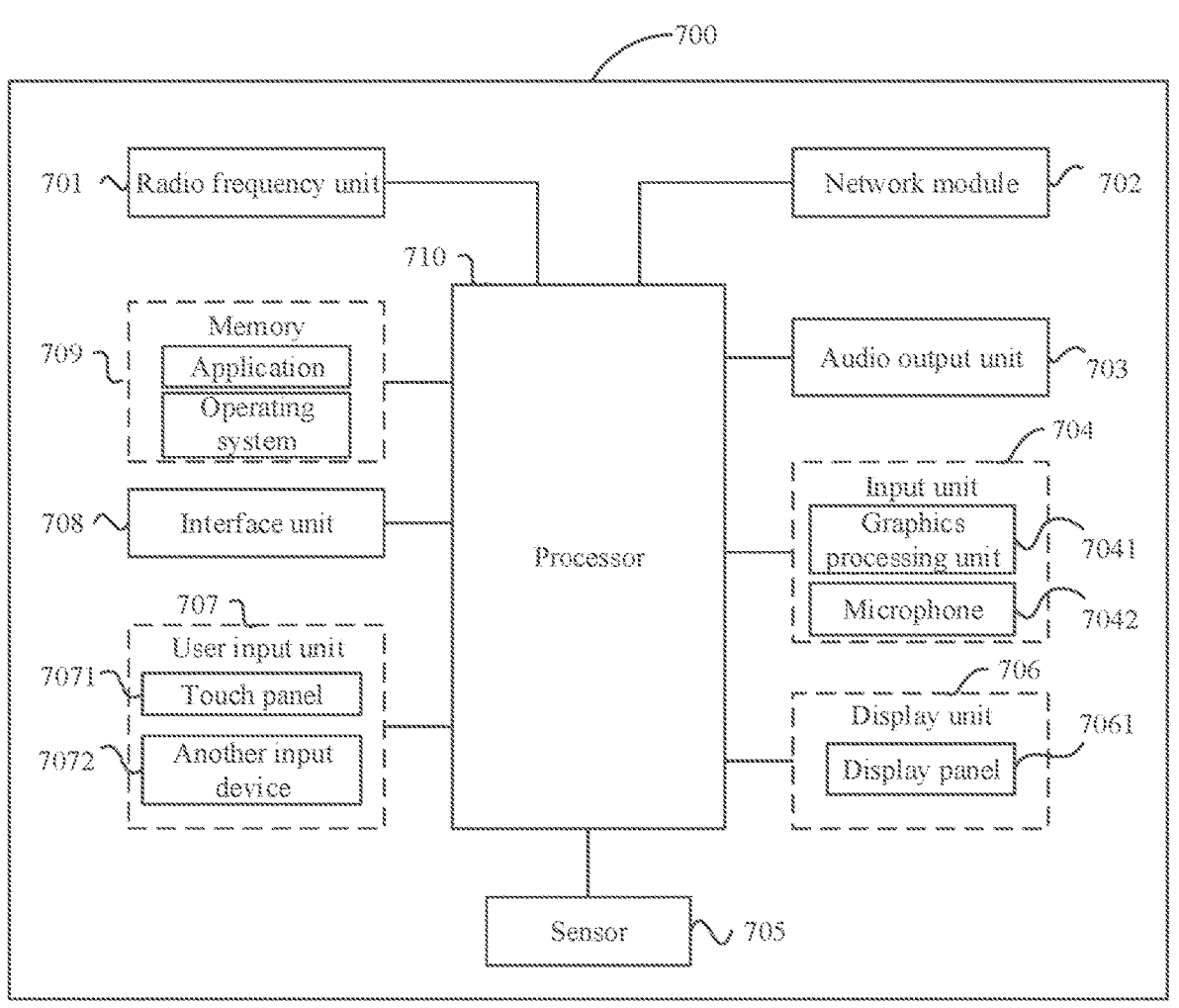
FIG. 7 is a schematic structural diagram of a terminal according to an embodiment of this application.

FIG. 7 is a schematic diagram of a hardware structure of a terminal according to an embodiment of this application.

A terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in the embodiments of this application, the input unit 704 may include a Graphics Processing Unit (GPU) 7041 and a microphone 7042, and the graphics processing unit 7041 processes image data of a still picture or video obtained by an image capture apparatus (for example, a camera) in a video capture mode or an image capture mode. The display unit 706 may include a display panel 7061. The display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 710 may include one or more processing units. For example, an application processor and a modem processor may be integrated into the processor 710. The application processor mainly processes an operating system, a user interface, an application, an instruction, or the like. The modem processor mainly processes wireless communications, for example, a baseband processor. It may be understood that, in some alternative embodiments, the modem processor may not be integrated into the processor 710.

The processor 710 is configured to determine SCS of an initial downlink BWP based on at least one of the following: a frequency position in which an SSB is located; a synchronization raster number of the SSB; a first frequency band in which an operating carrier of the SSB is located; SCS of the SSB; and indication of target signaling.

In the embodiments of this application, the terminal 700 may determine SCS of an initial downlink BWP based on at least one of the following: a frequency position in which an SSB is located; a synchronization raster number of the SSB; a first frequency band in which an operating carrier of the SSB is located; SCS of the SSB; and indication of target signaling.

The terminal 700 provided in this embodiment of this application can further implement the processes implemented in the method embodiments for indicating SCS of an initial downlink BWP, with the same technical effect achieved. To avoid repetition, details are not described herein again.

Figure 8:
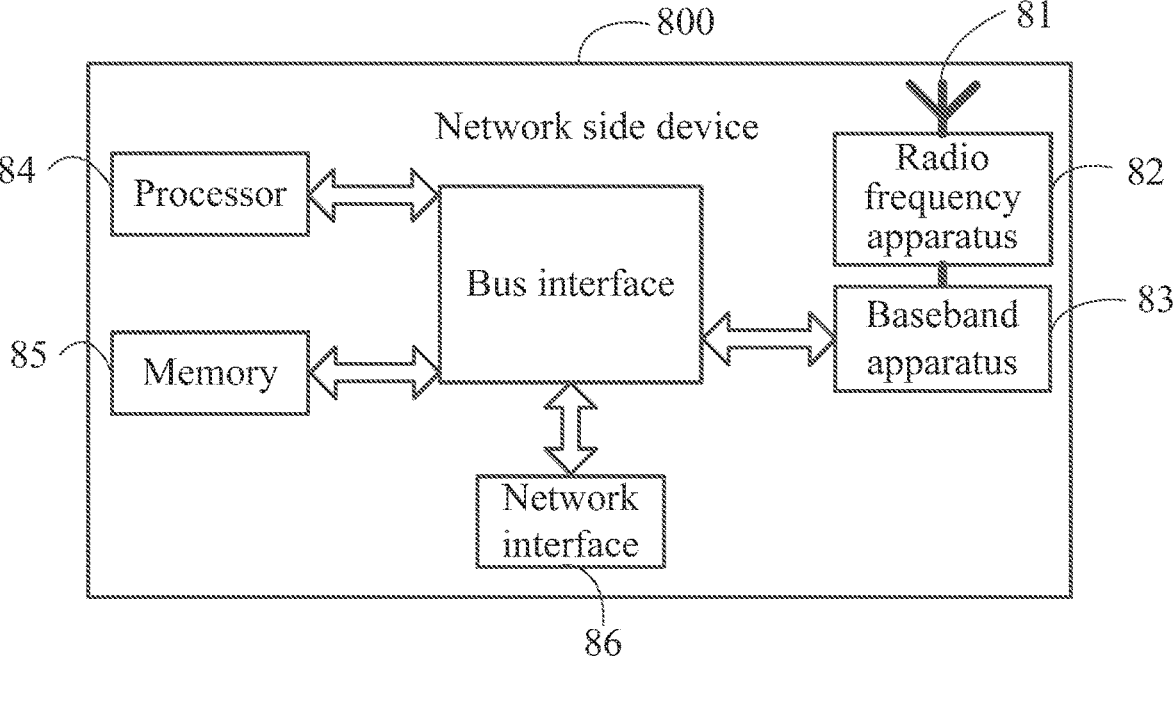
FIG. 8 is a schematic structural diagram of a network side device according to an embodiment of this application.

For example, an embodiment of this application further provides a network side device. As shown in FIG. 8, a network side device 800 includes an antenna 81, a radio frequency apparatus 82, and a baseband apparatus 83. The antenna 81 is connected to the radio frequency apparatus 82. In an uplink direction, the radio frequency apparatus 82 receives information through the antenna 81, and sends the received information to the baseband apparatus 83 for processing. In a downlink direction, the baseband apparatus 83 processes information to be sent and sends the information to the radio frequency apparatus 82, and the radio frequency apparatus 82 processes the received information and sends the information through the antenna 81.

The frequency band processing apparatus may be located in the baseband apparatus 83. The method performed by the network side device in the above embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to invoke a program in the memory 85 to perform operations of the network side device shown in the foregoing method embodiment.

The baseband apparatus 83 may further include a network interface 86, configured to exchange information with the radio frequency apparatus 82, where the interface is, for example, a Common Public Radio Interface (CPRI).

For example, the network side device in this embodiment of the present application further includes an instruction or a program stored in the memory 85 and executable on the processor 84. The processor 84 invokes the instruction or the program in the memory 85 to perform the method performed by the modules shown in FIG. 5, with the same technical effect achieved. To avoid repetition, details are not provided herein again.

An embodiment of this application further provides a readable storage medium. The readable storage medium stores a program or an instruction. When the program or the instruction is executed by a processor, the processes in the foregoing method embodiments for indicating SCS of an initial downlink BWP are implemented, with the same technical effect achieved. To avoid repetition, details are not described herein again.

The processor is the processor in the terminal described in the above embodiment. The readable storage medium includes a computer-readable storage medium, such as a computer ROM, a Random Access Memory (RAM), a magnetic disk, or an optical disc.

An embodiment of this application further provides a chip. The chip includes a processor and a communications interface, and the communications interface is coupled to the processor. The processor is configured to run a program or an instruction, to implement various processes of the foregoing method embodiments for indicating SCS of an initial downlink BWP, with the same technical effects achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network side device, or the like) to perform the methods in the embodiments of this application.

The embodiments of this application are described above with reference to the accompanying drawings, but this application is not limited to the foregoing implementations. The foregoing embodiments are only illustrative rather than restrictive. Inspired by this application, a person of ordinary skill in the art can still derive many variations without departing from the essence of this application and the protection scope of the claims. All these variations shall fall within the protection of this application.

What is claimed is:

1. A method for indicating SubCarrier Spacing (SCS) of an initial downlink Bandwidth Part (BWP), comprising:

determining, by a terminal, SCS of an initial downlink BWP based on at least one of the following:

a frequency position in which a Synchronization Signal and PBCH Block (SSB) is located, a synchronization raster number of the SSB, a first frequency band in which an operating carrier of the SSB is located, SCS of the SSB, or indication of target signaling; and performing transmission of a channel or a signal in the initial downlink BWP based on the determined SCS of the initial downlink BWP, wherein the determining SCS of an initial downlink BWP comprises one of the following:

using the SCS of the SSB as the SCS of the initial downlink BWP, determining the SCS of the initial downlink BWP based on the SCS of the SSB and the indication of the target signaling, or determining the SCS of the initial downlink BWP based on the indication of the target signaling, wherein the determining the SCS of the initial downlink BWP based on the SCS of the SSB and the indication of the target signaling comprises at least one of the following:

using the SCS of the SSB as the SCS of the initial downlink BWP when the SCS of the SSB is first target SCS; or determining the SCS of the initial downlink BWP based on the indication of the target signaling when the SCS of the SSB is second target SCS.

2. The method according to claim 1, wherein the using the SCS of the SSB as the SCS of the initial downlink BWP comprises using the SCS of the SSB as the SCS of the initial downlink BWP when the SCS of the SSB is third target SCS; or the determining the SCS of the initial downlink BWP based on the indication of the target signaling comprises determining the SCS of the initial downlink BWP based on the indication of the target signaling when the SCS of the SSB is fourth target SCS.

3. The method according to claim 1, wherein the target signaling comprises an indication field, wherein:

the indication field is used to indicate target information when the SCS of the SSB is fifth target SCS, or the indication field is used to indicate the SCS of the initial downlink BWP when the SCS of the SSB is sixth target SCS.

4. The method according to claim 1, wherein the target signaling comprises a target indication field that is used to indicate the SCS of the initial downlink BWP, wherein:

the target indication field is a common subcarrier spacing (subCarrierSpacingCommon) indication field, or the target indication field comprises a first indication field and a second indication field, and the first indication field is the common subcarrier spacing (subCarrierSpacingCommon) indication field.

5. The method according to claim 4, wherein the second indication field comprises at least one of the following:

a Physical Downlink Shared Channel-Demodulation Reference Signal (PDSCH-DMRS) position indication field in the SSB, a physical downlink control channel configuration system information block indication field in the SSB, an SSB-subcarrier offset indication field in the SSB, or a reserved field in the SSB.

6. The method according to claim 5, wherein the second indication field comprises the PDSCH-DMRS position indication field, wherein:

the PDSCH-DMRS position indication field has an association relationship with the SCS of the SSB, or the PDSCH-DMRS position indication field is used to indicate a fixed PDSCH-DMRS position and has no association relationship with the SCS of the SSB.

7. The method according to claim 5, wherein the second indication field comprises the physical downlink control channel configuration system information block indication field, wherein a quantity of valid licenses in a configuration table corresponding to a Control Resource Set (CORESET) indicated by the physical downlink control channel configuration system information block indication field is smaller than a first threshold, or a quantity of valid licenses in a configuration table corresponding to a search space indicated by the physical downlink control channel configuration system information block indication field is smaller than a second threshold.

8. The method according to claim 5, wherein the second indication field comprises the SSB-subcarrier offset indication field, wherein the SSB-subcarrier offset indication field comprises an indication bit that is used to indicate the SCS of the initial downlink BWP.

9. The method according to claim 1, wherein the first frequency band comprises one of the following:

a specified frequency range; or a specified frequency band in the specified frequency range.

10. A terminal, comprising: a processor; a memory having a computer program or an instruction stored thereon, wherein the computer program or the instruction, when executed by the processor, causes the processor to perform operations, comprising:

determining SubCarrier Spacing (SCS) of an initial downlink Bandwidth Part (BWP) based on at least one of the following:

a frequency position in which a Synchronization Signal and PBCH Block (SSB) is located, a synchronization raster number of the SSB, a first frequency band in which an operating carrier of the SSB is located, SCS of the SSB, or indication of target signaling; and performing transmission of a channel or a signal in the initial downlink BWP based on the determined SCS of the initial downlink BWP, wherein the determining SCS of an initial downlink BWP comprises one of the following:

using the SCS of the SSB as the SCS of the initial downlink BWP, determining the SCS of the initial downlink BWP based on the SCS of the SSB and the indication of the target signaling, or determining the SCS of the initial downlink BWP based on the indication of the target signaling, wherein the determining the SCS of the initial downlink BWP based on the SCS of the SSB and the indication of the target signaling comprises at least one of the following:

using the SCS of the SSB as the SCS of the initial downlink BWP when the SCS of the SSB is first target SCS; or determining the SCS of the initial downlink BWP based on the indication of the target signaling when the SCS of the SSB is second target SCS.

11. The terminal according to claim 10, wherein the using the SCS of the SSB as the SCS of the initial downlink BWP comprises using the SCS of the SSB as the SCS of the initial downlink BWP when the SCS of the SSB is third target SCS; or the determining the SCS of the initial downlink BWP based on the indication of the target signaling comprises determining the SCS of the initial downlink BWP based on the indication of the target signaling when the SCS of the SSB is fourth target SCS.

12. The terminal according to claim 10, wherein the target signaling comprises an indication field, wherein:

the indication field is used to indicate target information when the SCS of the SSB is fifth target SCS, or the indication field is used to indicate the SCS of the initial downlink BWP when the SCS of the SSB is sixth target SCS.

13. The terminal according to claim 10, wherein the target signaling comprises a target indication field that is used to indicate the SCS of the initial downlink BWP, wherein:

the target indication field is a common subcarrier spacing (subCarrierSpacingCommon) indication field, or the target indication field comprises a first indication field and a second indication field, and the first indication field is the common subcarrier spacing (subCarrier-SpacingCommon) indication field.

14. The terminal according to claim 13, wherein the second indication field comprises at least one of the following:

a Physical Downlink Shared Channel-Demodulation Reference Signal (PDSCH-DMRS) position indication field in the SSB, a physical downlink control channel configuration system information block indication field in the SSB, an SSB-subcarrier offset indication field in the SSB, or a reserved field in the SSB.

15. A non-transitory computer-readable storage medium storing a computer program or an instruction that, when executed by a processor, causes the processor to perform operations, comprising:

determining SubCarrier Spacing (SCS) of an initial downlink Bandwidth Part (BWP) based on at least one of the following:

a frequency position in which a Synchronization Signal and PBCH Block (SSB) is located, a synchronization raster number of the SSB, a first frequency band in which an operating carrier of the SSB is located, SCS of the SSB, or indication of target signaling; and performing transmission of a channel or a signal in the initial downlink BWP based on the determined SCS of the initial downlink BWP, wherein the determining SCS of an initial downlink BWP comprises one of the following:

using the SCS of the SSB as the SCS of the initial downlink BWP, determining the SCS of the initial downlink BWP based on the SCS of the SSB and the indication of the target signaling, or determining the SCS of the initial downlink BWP based on the indication of the target signaling, wherein the determining the SCS of the initial downlink BWP based on the SCS of the SSB and the indication of the target signaling comprises at least one of the following:

using the SCS of the SSB as the SCS of the initial downlink BWP when the SCS of the SSB is first target SCS; or determining the SCS of the initial downlink BWP based on the indication of the target signaling when the SCS of the SSB is second target SCS.

* * * * *